E. C. LEACH.
CONTROL MEANS FOR BELT DRIVEN MACHINERY.
APPLICATION FILED FEB. 11, 1915.
1,164,729.
Patented Dec. 21, 1915.
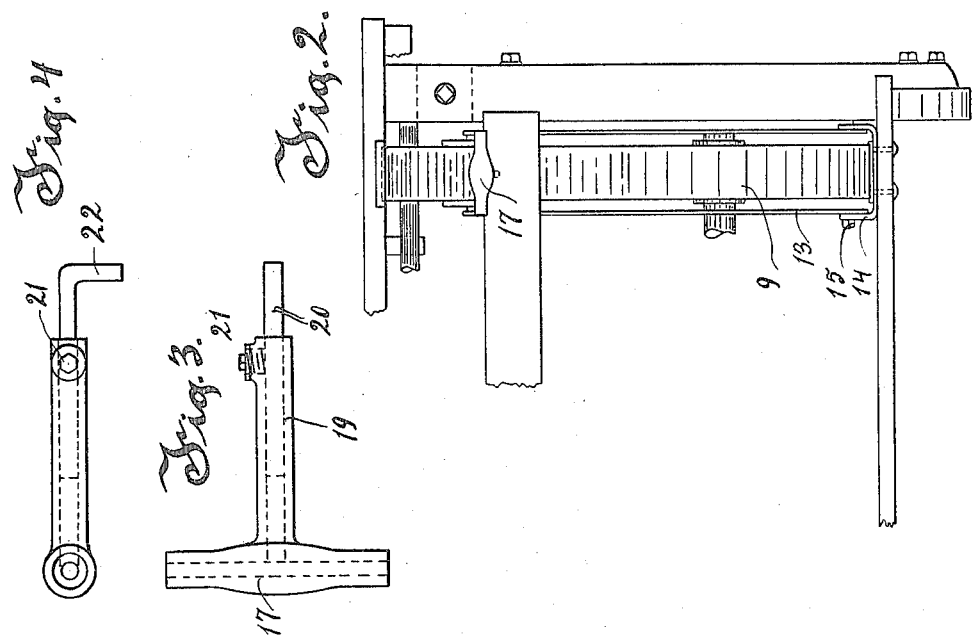
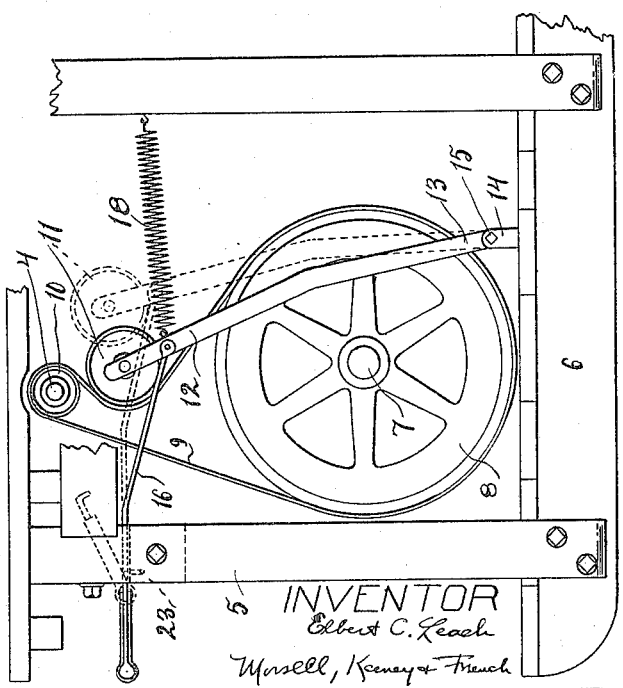
WITNESSES
Emily Schowalter.
INVENTOR
Elbert C. Leach
Morsell, Keeney & French
ATTORNEYS.

UNITED STATES PATENT OFFICE.

ELBERT C. LEACH, OF OSHKOSH, WISCONSIN, ASSIGNOR TO OSHKOSH MANUFACTURING COMPANY, OF OSHKOSH, WISCONSIN, A CORPORATION OF WISCONSIN.

CONTROL MEANS FOR BELT-DRIVEN MACHINERY.

1,164,729.　　　　Specification of Letters Patent.　　Patented Dec. 21, 1915.

Application filed February 11, 1915. Serial No. 7,599.

*To all whom it may concern:*

Be it known that I, ELBERT C. LEACH, a citizen of the United States, and resident of Oshkosh, in the county of Winnebago and State of Wisconsin, have invented new and useful Improvements in Control Means for Belt-Driven Machinery, of which the following is a description, reference being had to the accompanying drawings, which are a part of this specification.

The invention relates to control means for belt driven machinery.

The invention designs more particularly to provide means for tightening and loosen ing the belt of a belt driven arbor for use in woodworking machinery where said arbor is employed to carry different kinds of woodworking tools, such as saws, drills and joiner knives, whereby the tightening of the belt will rotate the arbor and whereby the loosening of the belt will stop the arbor so that the tools may be changed without stopping the driving mechanism.

The invention further designs to provide a new and improved form of control for belt driven machinery.

The invention consists in the several features hereinafter set forth and more particularly defined by claims at the conclusion hereof.

In the drawings; Figure 1 is an elevation of the device embodying the invention; Fig. 2 is an end view thereof parts being broken away; Fig. 3 is a plan view of the operating handle; Fig. 4 is an elevation of the operating handle.

The control means is shown applied to a portable woodworking machine comprising a tool carrying arbor 4 journaled in a frame 5 mounted on skids 6. An engine (not shown) is adapted to be mounted on the frame 5 and has a drive shaft 7 upon which a fly wheel 8 is mounted. An endless belt 9 runs loosely over the fly wheel 8 and a pulley 10 on the arbor 4 to provide a belt drive for the arbor.

The control comprises an idler wheel 11 in engagement with the belt 9 and journaled in the transverse portion of a swinging frame or yoke member 12 whose ends 13 are pivotally secured to a bracket 14 on the frame 15, the belt being disposed between the arms of the yoke and means for swinging the yoke member 12 to move the idler wheel 10 to tighten or loosen the belt. The means for swinging the yoke member 12 comprises a yoke member whose arms 16 are pivotally secured to the arms of the yoke 12 at one of their ends and are pivotally secured at their other ends to the transverse portion 17 of the yoke, which transverse portion also serves as an operating handle. The yoke member 12 is held against movement in one direction by a spring 18 secured to it and to the frame of the machine. The operating handle 17 of the yoke member is provided with an extension 19 having an aperture therein for receiving a locking bar 20 which is adjustably secured within the extension 19 by a set screw 21. This locking bar 20 has a bent end 22 which is adapted to be inserted in an aperture 23 in the frame of the machine. It will be noted that the belt 9 is disposed between the arm 16 and that the adjustment of the rod 20 permits the pulley 11 to be brought up into different positions of adjustment against the belt 9.

The operation of the device is as follows:—The engine shaft 7 is rotated continuously by the engine and consequently the fly wheel 8 mounted thereon is rotated and if the belt 9 is tightened the arbor 4 will be continuously driven. Now if it is desired to change the tools on the arbor the operator grasps the handle 17 lifts the end 22 of the rod 20 from engagement with the aperture 23 in the frame to permit the arms 16 of the yoke member to move outwardly to cause the yoke 12 to swing away from the frame, and consequently the wheel 11 as shown in the dotted lines in Fig. 1. Resultantly the belt 9 will be loosened so that it will no longer drive the arbor though the fly wheel 8 is rotating continuously. The movement of the fly wheel is then stopped and the change in tools may be made while the engine is running and after this is done the arbor is again started up by pulling the handle 17 inwardly to cause the rod 20 to again be brought in locking engagement with the frame which pulling action is exerted against the action of the spring 18 and which results in inward movement of the yoke member 12 to cause the pulley 11 to tighten the belt 9 and thus bring the arbor and fly wheel again into driving relation.

The invention thus exemplifies a control for a belt driven shaft comprising means during the continuous operation of the driving mechanism.

The invention is not to be restricted to the details of construction herein set forth but may be varied so as to be within the scope of appended claims.

What I claim as my invention is:—

1. In a belt driven machine, the combination with a frame, an arbor mounted thereon, a drive wheel and an endless belt for operatively connecting said arbor and drive wheel, of control means therefor comprising a swinging yoke pivotally secured to said frame, a wheel pivotally mounted upon said yoke and in engagement with said belt, a yoke pivotally secured to said swinging yoke, and means for moving said yokes and wheel inwardly to tighten the belt and to drive the arbor and for moving said yoke and wheel to loosen the belt to stop the arbor while the drive wheel is running, said belt being disposed within the arms of said for tightening the belt to drive the shaft and means for loosening the belt to stop the shaft yokes.

2. In a belt driven machine, the combination with a frame, an arbor mounted thereon, a drive wheel and an endless belt for operatively connecting said arbor and drive wheel, of control means therefor comprising a swinging yoke mounted on the frame, a wheel pivotally mounted upon said yoke and in engagement with said belt, a pair of arms pivotally secured to said swinging yoke, a handle member revolubly connected to said arms, and a locking member carried by said handle for securing said arms and handle in position upon the frame to tighten the belt to drive the arbor.

In testimony whereof, I affix my signature in presence of two witnesses.

ELBERT C. LEACH.

Witnesses:
  N. W. HUELSTER,
  L. C. CROSBY.

Copies of this patent may be obtained for five cents each, by addressing the "Commissioner of Patents, Washington, D. C."

It is hereby certified that in Letters Patent No. 1,164,729, granted December 21, 1915, upon the application of Elbert C. Leach, of Oshkosh, Wisconsin, for an improvement in "Control Means for Belt-Driven Machinery," an error appears in the printed specification requiring correction as follows: Page 2, strike out lines 25 and 26; and that the said Letters Patent should be read with this correction therein that the same may conform to the record of the case in the Patent Office.

Signed and sealed this 11th day of January, A. D., 1916.

[SEAL.]

J. T. NEWTON,

*Acting Commissioner of Patents.*

Cl. 64—5.